United States Patent
Tigner

[15] 3,683,584
[45] Aug. 15, 1972

[54] LOADING METHOD AND APPARATUS
[72] Inventor: Ruben A. Tigner, 3157 S. W. Riverview Drive, Bay City, Mich. 48706
[73] Assignee: Dow Chemical Company, Midland, Mich.
[22] Filed: July 23, 1970
[21] Appl. No.: 57,708

[52] U.S. Cl. .........................53/35, 53/243, 53/253, 53/258, 99/174, 99/178
[51] Int. Cl. ........................B65b 5/06, B65b 39/14
[58] Field of Search..........53/35, 184, 242, 243, 253, 53/392, 255, 258; 141/113, 273; 214/6 BA; 99/171 R, 174, 178

[56] References Cited
UNITED STATES PATENTS

| | | |
|---|---|---|
| 3,267,636 | 8/1966 | Sternberg.................53/243 X |
| 3,309,840 | 3/1967 | Bilaisis.......................53/243 |
| 2,869,297 | 1/1959 | Neer.......................53/243 X |

Primary Examiner—Robert L. Spruill
Attorney—Griswold & Burdick, Burke M. Halldorson and Richard G. Waterman

[57] ABSTRACT

Method and apparatus for automatically loading luncheon meat, cheese and like products into preformed container parts. In practicing the invention the container part is inverted, and the product lifted upwardly and pressed into the part. The loaded part is then rotated approximately 180° and released such as onto a conveyor system for delivery for further package assembling. Precise control and positioning of the product is maintained through all phases of loading. In addition, such a loading method and apparatus is readily adapted to be fully automated, if desired, and can load at speeds "in line" with high speed package assembling apparatus, vacuumizing stations, sealing stations, etc.

15 Claims, 5 Drawing Figures

PATENTED AUG 15 1972

INVENTOR.
Ruben A. Tigner
BY
Burke M. Halderson
ATTORNEY

INVENTOR.
Ruben A. Tigner
BY
Burke M. Halldorson
ATTORNEY

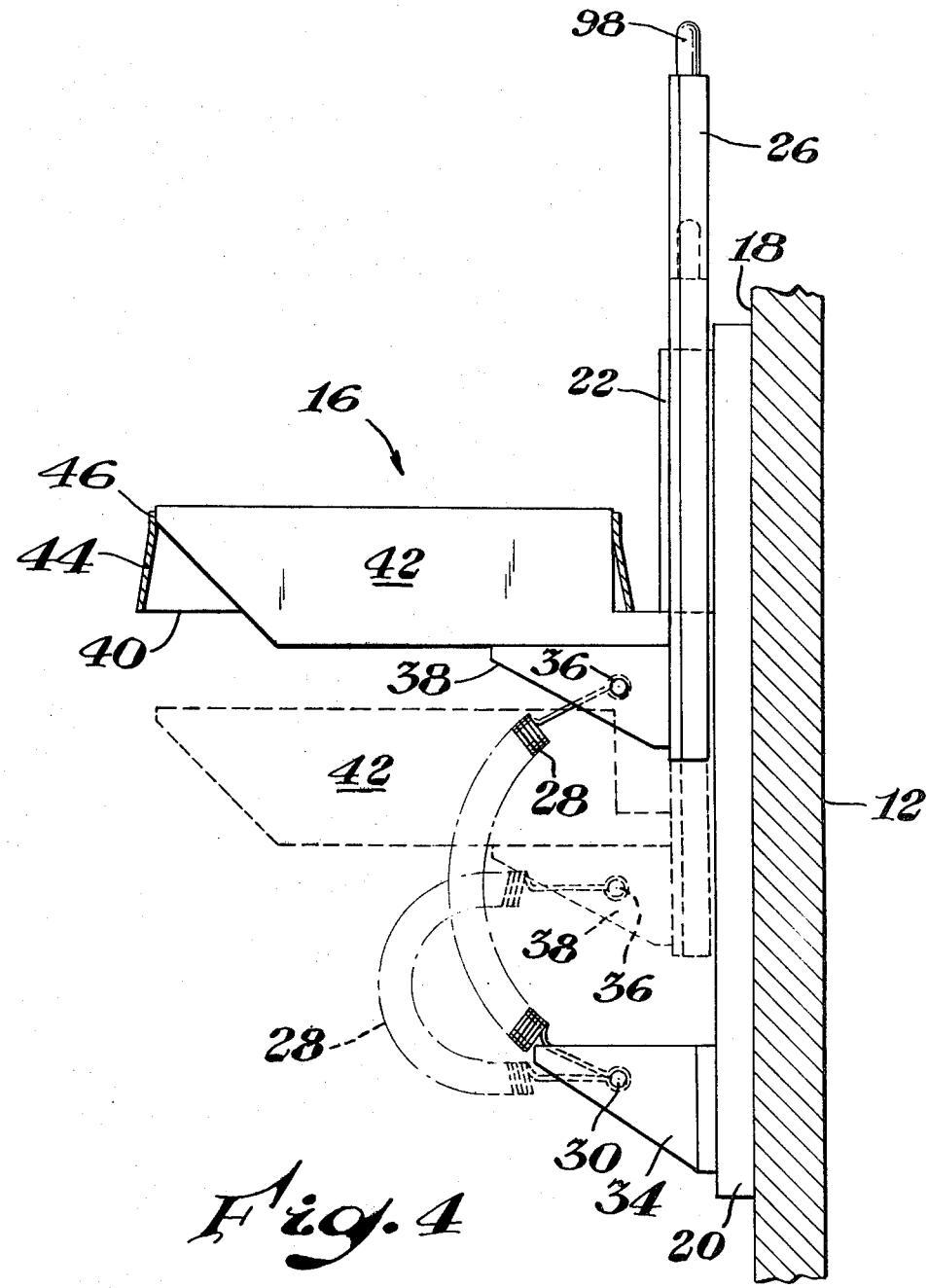

LOADING METHOD AND APPARATUS

BACKGROUND OF THE INVENTION

1. Field of the Invention

The present invention relates generally to apparatus for automatically loading container parts with product. More particularly the invention relates to such apparatus desirably operable in line with vacuum packaging equipment, but not limited thereto, and which particularly solves problems associated with loading sliced products to be vacuum packed, or products comprising a plurality of individual items such as frankfurters, or the like.

2. Discussion of the Prior Art

Sliced luncheon meat, cheese and like products are frequently desirably packed in vacuum or gas flush packages. Normally packages of this sort comprise lightweight plastic or metal parts such as a lid fitable to a tub part. Packages of the indicated variety, for example, are illustrated in some detail in U.S. Pat. Nos. 3,086,869; 3,087,823; 3,229,810 and 3,454,158.

Such packages ordinarily include at least one preformed part, generally referred to as rigid or self-supporting; and a flexible part or, alternatively, a second preformed part. Where a flexible component is involved, normally the rigid part comprises a base or lid member having a flat central region adapted to receive the product, and outwardly thereof a peripherally continuous sealing groove or rim is customarily located. The product is usually loaded by placing the same on the central region of the base, for example, and the flexible part is then intimately fitted over the product and hermetically sealed to the base with a vacuum or partial vacuum inside the package.

In addition, as mentioned above, such base or lid members also are frequently combined with preformed tubs or covers. In this latter instance, the product is oftentimes first loaded into the tub or cover, and the lid or base member subsequently applied to form an assembled package.

In either instance, automatic and even manual loading is difficult due to the necessity of having to precisely place the product in the central region for base or lid members, or in the relatively deep or shallow cavity, as the case may be, defined by such tub or cover parts. Moreover, to obtain a sturdy package, the tub frequently must be intimately conformed to product shape and size. For example, a tight fit is customary in vacuum packages to minimize wrinkles and/or package distortion when a vacuum or partial vacuum is drawn, and the package thereafter exposed to atmospheric pressure. In addition, when the product is sliced as is oftentimes the case with cheese and meat products, or comprises a plurality of whole parts as in the case of frankfurters, precise automatic or manual assisted loading into a tightly fitting container part can be even further complicated.

Certain of the prior art techniques for loading lid parts, for example, employ a vertical two or three sided retaining wall structures into which the product is manually inserted in a horizontal position. The lid is usually located in precise position beneath the retaining walls which are open ended at the bottom, and thus permit the product to be hand moved vertically downwardly to be manually positioned on the lid. Oftentimes it is necessary that the retaining walls be movable away from the product to avoid an undesirable amount of friction along the edges of the product and the walls. Objectionably, also, the operator's hand is normally in an interfering position with product loading. In other words, usually the operator's hand is positioned at the underside of the product to control movement of the same downwardly and therefore is positioned between the container part and the product. This, in turn, occasions "dropping" the product a short distance. Where the latter is sliced, dropping can cause an unsatisfactory disarrangement of the slices, and therefore improper loading. In addition, the extensive manual handling required is considered undesirable in food packaging in that maximum sanitary conditions are difficult to control and maintain.

Tub loadings pose additional troublesome problems. For example, frequently there is no room for the operator's hand to enter the tub in the area between the side of the product and the tub sidewall, or to handle the product at its underside as the product enters the tub. Some automatic loading equipment has been provided for tubs, therefore, that operates basically on a "trap" door principle. For example, the product can be first loaded into a confined region having a trap door that opens downwardly or otherwise opens to permit the product to be dropped into the tub. Since gravity accelerates the product as it drops, sliced products are especially difficult to load in this manner. The bottom slice, for example, can become disunited while dropping, or can improperly enter the tub, that is, the same can tilt or move from the horizontal plane while dropping. Thus, the product can lodge on the tub rim or the peripheral edge thereof or otherwise can improperly enter the tub. Present practice, therefore, is to accelerate the product as it is descending into the tub at a rate greater than 32 feet per second per second or the gravity acceleration rate. Some control over the stack is thus obtained over that possible in free fall.

The prior art has, in addition, experimented with extremely thin members to fit in the tight space between the product and tub side wall as a means of obtaining greater control over downward movement of the product. Maximum product control, however, is still difficult to obtain despite the use of such thin members. Such loading equipment, therefore, is not wholly satisfactory, and oftentimes, in addition, is frequently complicated and expensive.

It is, therefore, among the objects of the present invention to provide the following:

Automatic loading apparatus and method wherein maximum control of the product is possible through all phases of loading;

Such apparatus and method adaptable for loading whole products and, in addition, equally applicable for controllably loading sliced products such as sliced cheese or luncheon meats, or a plurality of products as, for example, frankfurters or the like;

Automatic loading apparatus and method capable of controllably loading sliced products or a plurality of whole products into tight fitting container parts such as of a type used for vacuum or gas flush packaging;

Such apparatus and method that is relatively inexpensive compared to present day automatic loading equipment, and which is operable "in line" with high speed packaging equipment such as package assembling apparatus, gas flushing or vacuumizing stations, sealing stations and the like;

Apparatus and method for loading sliced products into package parts of a type conformed to tightly fit the product, such as is frequently required in the vacuum packaging art, and wherein maximum control of the sliced stack of products is maintained throughout the loading step, and in addition, where slice disalignment when encountered, is readily correctable accompanying loading of the product into the container part; and Apparatus of the type indicated wherein loading is efficiently accomplished without danger of contaminating the sealing region of the part as might effect hermetic sealing of the assembled package.

BRIEF SUMMARY OF THE INVENTION

Briefly then, the present invention contemplates improved automatic loading apparatus and method wherein precise product control and positioning is maintained throughout all critical phases of loading. Such improved loading is accomplished by inverting the container part, and then lifting the product upwardly and pressing the same into or against the part depending on whether the part comprises a tub, lid, cover, base, etc. During upward movement the product can be controllably passed through a guide ring or like member, including a tapered sidewall for sliced products such that precise alignment of the slices during loading is maintained, and, in addition, wherein original misalignment is corrected before entry of the product into the part. Such a guide ring, moreover, desirably supports the underside of the part at a region slightly inside the latter's peripheral sealing groove, sealing rim or the like. The sealing area is thereby automatically "blocked off" from possible contamination by grease or like product substances during loading. The incidence of possible "leakers" due to improper sealing is thereby minimized, as will become more fully evident hereinafter. Moreover, such apparatus is relatively inexpensive compared to present day automatic loading apparatus and can operate at machine packaging speeds applicable for "in line" operation with high speed packaging equipment such as lid or tub applying stations, vacuumization or gas flush stations, sealing stations and the like.

The preferred embodiments of the invention are shown in the accompanying drawings wherein wheresoever possible like reference numerals designate corresponding materials and parts throughout the several views thereof in which:

FIG. 4 is a partial side view of the loading module of FIG. 2; and

DESCRIPTION OF THE PREFERRED EMBODIMENT

Figure 1:
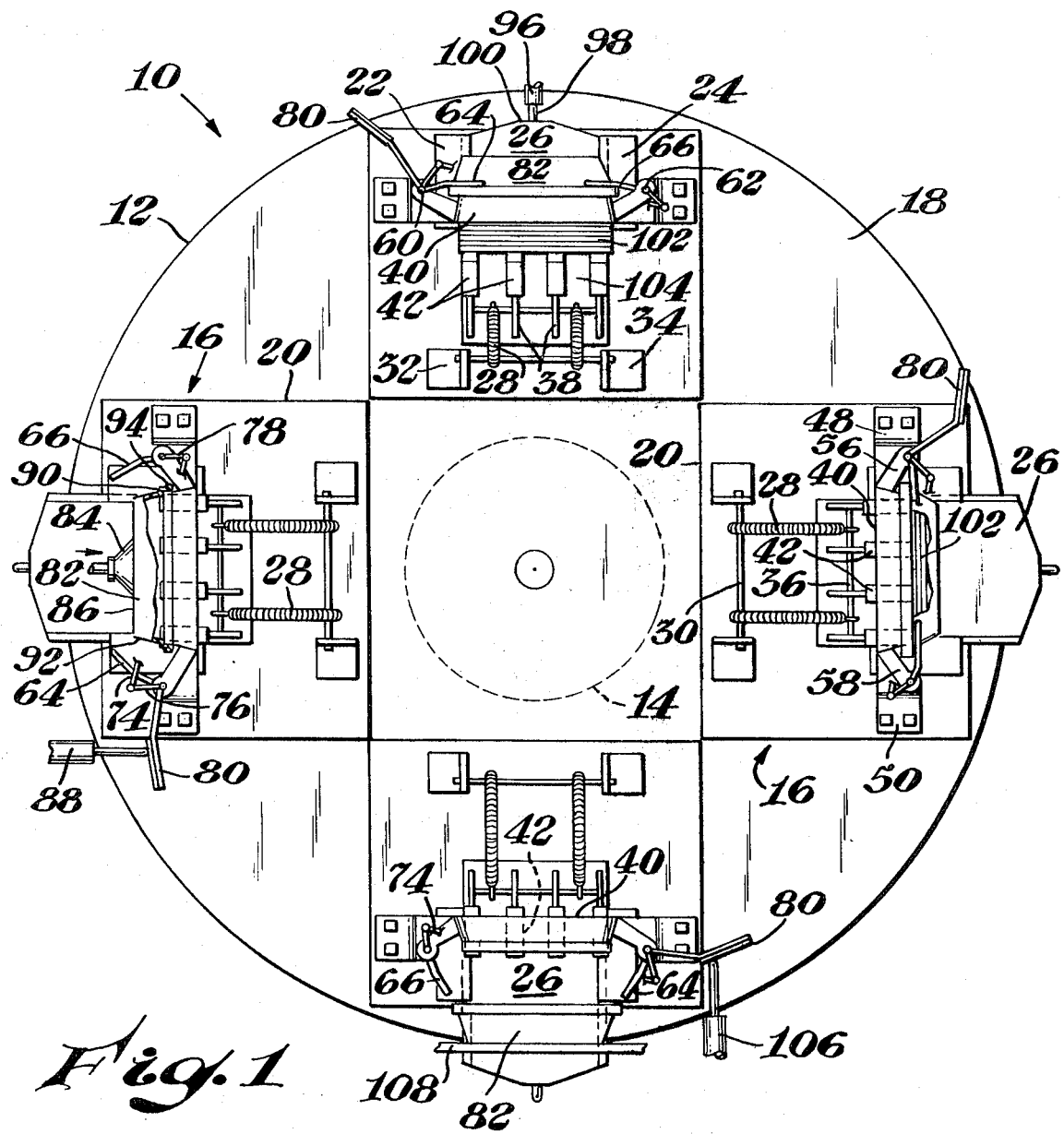
FIG. 1 is an elevational view of the automatic loading apparatus of the present invention as embodied in a plurality of identical loading modules cooperatively arranged on rotatable table means, each of the modules being constructed according to the principles of the present invention.

Looking now with more particularity to the drawings, there is shown in FIG. 1, automatic loading apparatus 10 comprising a vertically positioned table or wheel 12 rotatably operated such as by an indexing drive assembly denoted generally at 14. Four loading modules 16, identical to each other are affixed symmetrically on vertical face 18 of table 12 with 90° or one-quarter turn spacing between the modules.

Figure 2:
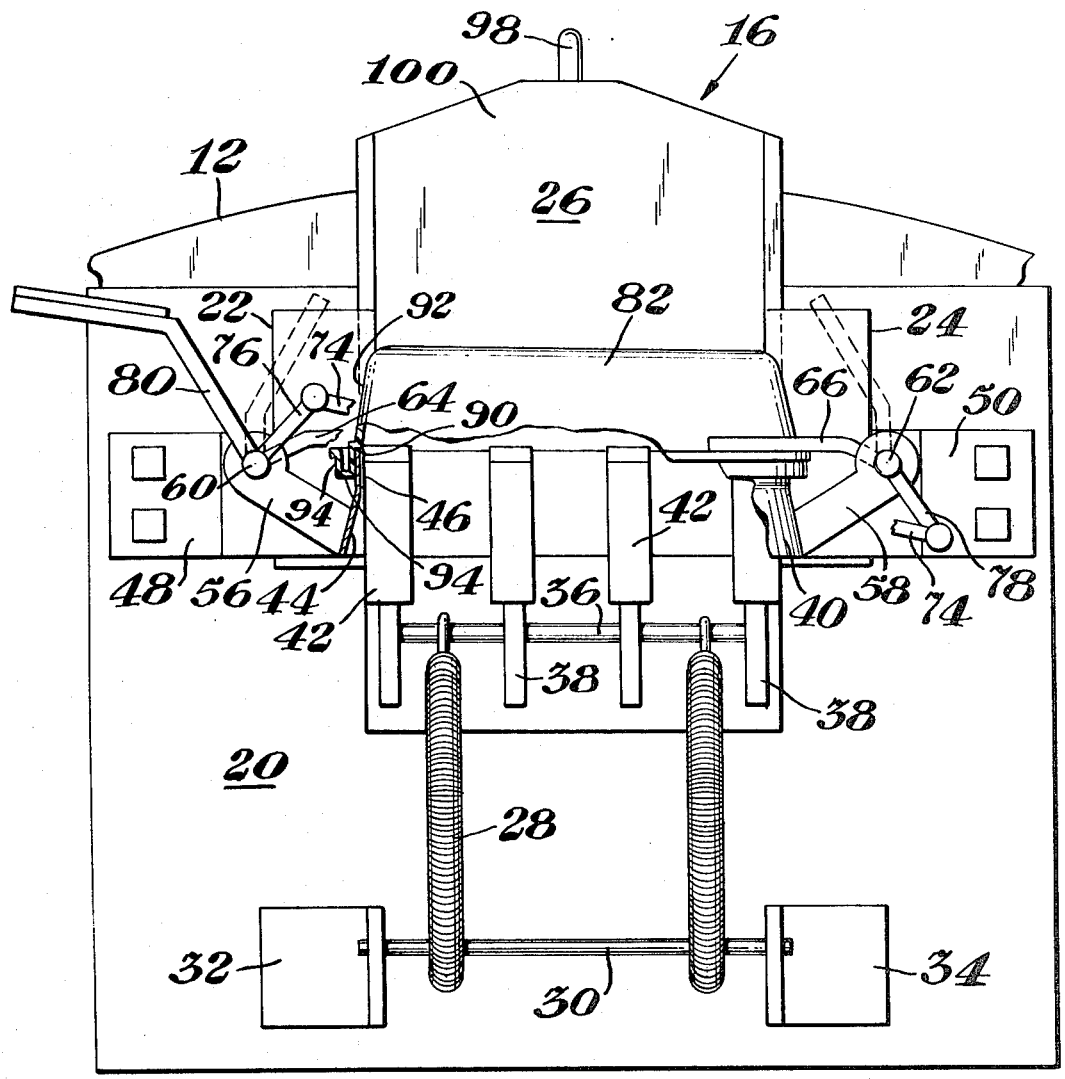
FIG. 2 is an enlarged front elevation view illustrating the construction of the loading modules of FIG. 1, but with certain parts thereof being broken away to show more detail.
Figure 3:
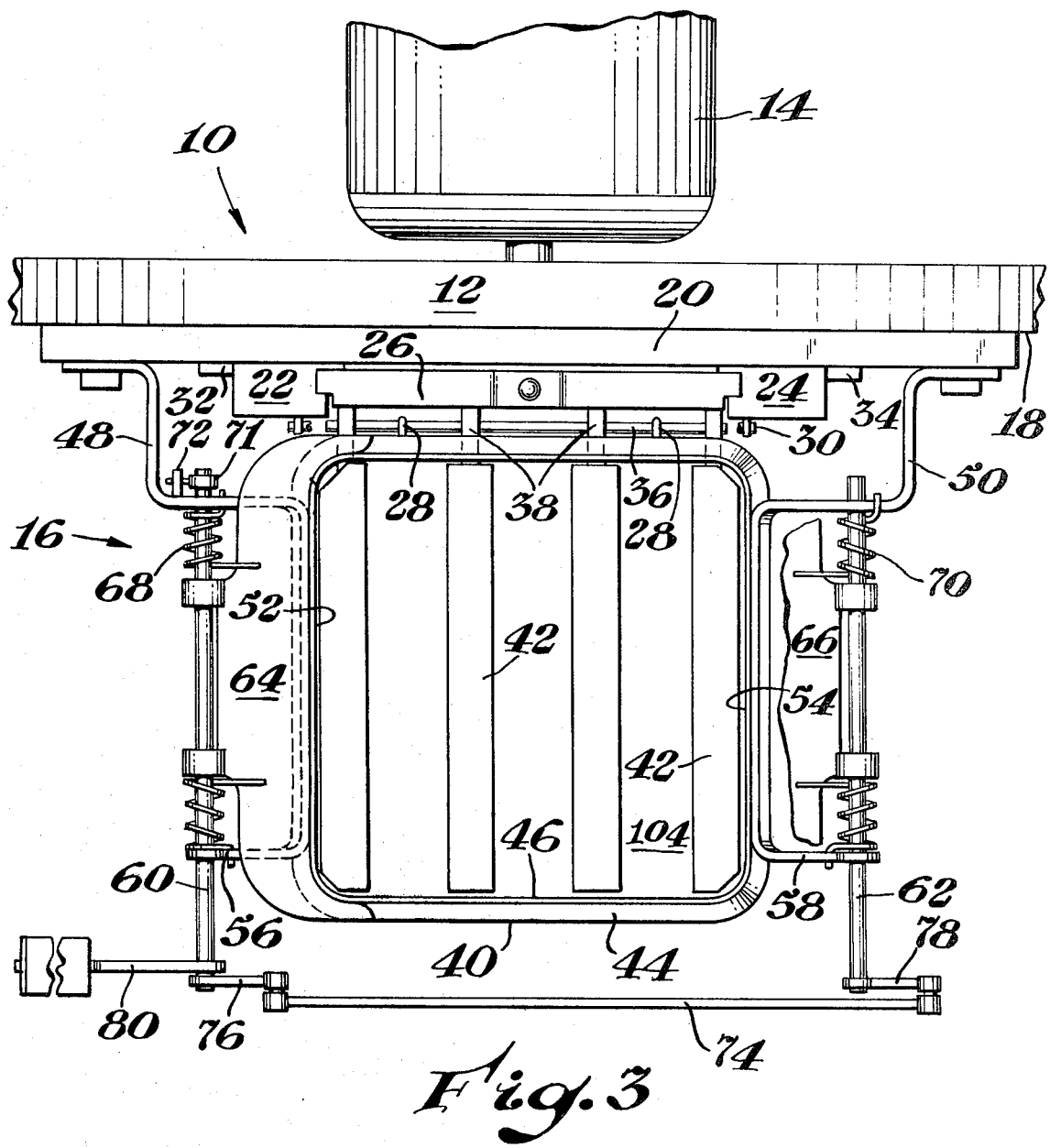
FIG. 3 is a top view of the loading module of FIG. 2.

Modules 16 are represented in more detail in FIGS. 2–4. Each can comprise a first or back mounting plate 20 adapted to be affixed rigidly to face 18 and which, in turn, mounts spaced apart grooved bearing pieces or guides 22 and 24, as is best shown in FIGS. 2 and 3. A second or movable plate 26 is slidably carried between guides 22 and 24, and is spring loaded in a direction radially outwardly of table 12 such as by a plurality of constant force springs denoted generally at 28.

Springs 28 are commonly attached adjacent their lower ends to a shaft or rod 30, in turn, attached to mounting plate 20 through rigid fastener pieces denoted at 32 and 34. The upper ends of springs 28 are commonly attached in a similar manner to a second shaft 36, in turn, attached to movable plate 26 through a plurality of support members 38. Support members 38, in turn, rigidly mount a plurality of loading fingers 42. In the rest position, loading fingers 42 are carried centrally within a guide ring 40 (see FIG. 4), but are movable therefrom as will be explained more fully hereinafter.

Guide ring 40 preferably comprises a peripherally continuous sidewall 44 gradually tapered or conformed inwardly, but defining a substantially vertically positioned upper rim portion 46. Brackets 48 and 50 are rigidly affixed to opposite sides 52 and 54 of guide ring 40, and extend outwardly therefrom beyond guides 22 and 24, respectively, and then conform backwardly and are bolted or otherwise attached to back mounting plate 20. A second pair of brackets 56 and 58 are affixed to sides 52 and 54, respectively, and cooperate with brackets 48 and 50 to rotatably mount shafts 60 and 62, respectively. Opposed bonnets or holders 64 and 66, in turn, are fixedly attached to shafts 60 and 62, respectively. Bonnets 64 and 66 are spring loaded downwardly such as by springs 68 and 70 carried generally centrally on shafts 60 and 62. Each spring, for example, can rest against or be attached at one end to the most adjacent bracket 48 or 50, or 56 and 58. The opposite ends of the springs are then extended downwardly underneath shafts 60 and 62 and then upwardly onto bonnets 64 and 66 where they rest or are attached thereby urging the bonnets downwardly or toward guide ring 40 as explained above. A catch 71 is affixed to shaft 60 outwardly of bracket 48 and operates against a nob or lug 72 affixed to bracket 48. The catch limits the extent of the downward movement of the spring loaded bonnet 64 and, in addition, that of bonnet 66, as will become evident hereinafter.

A connecting rod 74 is located to one side of guide ring 40 (see FIG. 3) and is pivotally attached at its ends to lever members 76 and 78, respectively, in turn, rigidly keyed to shafts 60 and 62, respectively. The levers are attached approximately 180 degrees out of phase, as is best shown in FIG. 2. Movement of lever 76 counterclockwise, therefore, turns shaft 60 counterclockwise, but shaft 62 clockwise, thereby cooperatively raising bonnets 64 and 66 against the force of springs 68. A levered cup or plate member 80 is attached to the outer extremity of shaft 60 for activating such movement of bonnets 64 and 66.

OPERATION

To operate loading apparatus 10, containers 82 such as clear plastic tubs, are individually delivered to modules 16 at the 9 o'clock position on table 12, as is best shown in FIG. 1. Individual containers can be delivered from conventional dispersing equipment, for example, of a type employing a vacuum gripping head or suction 84 which attaches to the top wall 86 of the containers, and delivers same vertically into the region between holders 64 and 66. Generally simultaneously with the movement of containers 82 toward module 16, activating means, such as an air cylinder 88, is operated to depress cup member 80, thereby opening bonnets 64 and 66 to receive container 82. The cylinder arm is then retracted, whereby bonnets 64 and 66 spring closed, thereby resiliently locking container 82 between themselves and rim 46 of guide ring 40.

Guide ring 40 continuously engages the container 82 along a ledge portion 90 defined between the container sidewall 92 and its peripheral sealing groove 94 (see FIG. 2). Guide ring 40 thus completely "blocks off" groove 94, thereby positively preventing grease or other product contamination from contacting the sealing groove while loading the product into the container, as will become even more evident hereinafter.

Subsequent to or accompanying locking of container 82 between bonnets 64 and 66 and guide ring 40, suction is released from vacuum gripping head 84, and table 12 indexed forward one-quarter turn to place the module at the 12 o'clock position. A second activating means, such as a second air cylinder 96, is then operated to depress movable fingers 42 downwardly against the load of springs 28 and to the position as is indicated in dotted lines in FIG. 4. The second cylinder 96 works, for example, against a probe or cam follower means 98 affixed to movable plate 26 adjacent its upper central portion as denoted at 100.

A product 102, such as sliced luncheon meat, cheese or the like, is then manually or, most desirably, automatically loaded on fingers 42, again as is best shown in FIGS. 1 and 4. Automatic delivery of product 102 to fingers 42, for example, can be obtained by employing spaced apart delivery fingers (not shown). Such delivery fingers could place the product in a position slightly raised above fingers 42 by moving in the spaces 104 defined between the same, and then could be lowered in spaces 104 to deposit the product on fingers 42. The delivery fingers could then be retracted to a non-interfering position, and be manually or automatically reloaded to await the next loading cycle.

Subsequent to or accompanying placement of product 102 in position, air cylinder 96 is retracted, moving fingers 42 upwardly, and thereby lifting product 102 through guide ring 40, and pressing the same into container 82 via the force of springs 28. Tapered sidewall 44 of the guide ring desirably guides the side edges of product 102 as it is lifted into container 82, thereby assisting to precisely align the individual slices as they enter the container. Thus, for loading sliced products, rim 46 of guide ring 40 preferably defines an internal opening peripherally contiguous with or slightly smaller than the peripheral edge region of product 102.

Thereafter, table 12 is again indexed forward one-quarter turn moving module 16 to the 3 o'clock position which represents a rest position. An additional one-quarter turn, following the rest interval, moves the module to the 6 o'clock position where a third activating means, such as an air cylinder denoted schematically at 106, is operated to again depress cup member 80. Bonnets 64 and 66 thereby cooperatively open to release the filled container 82 onto a conveyor assembly, for example, as is indicated generally at 108. It may be noted that container 82 is now reversibly oriented or rests on its top wall 86.

Conveyor assembly 108 would then customarily deliver the filled container 82 to a lid applying station, and possibly to a vacuumizing and/or gas flushing station, such as where a perishable product 102, as for example cheese or luncheon meat, is involved (not shown). Such stations, if desired, can be placed in line with apparatus 10.

Figure 5:
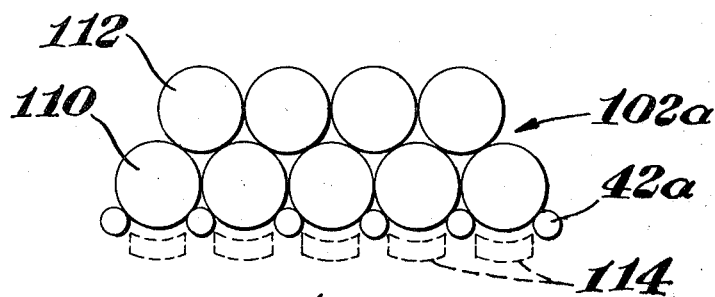
FIG. 5 is a partial end view showing the module of FIG. 2 modified to accommodate loading a plurality of stacked whole products of generally elongated cylindrical configuration.

FIG. 5 shows a modified finger 42a construction applicable, for example, for loading a plurality of products 102a such as a plurality of frankfurters or the like. Fingers 42a can be substantially round in configuration, at least at their uppermost extents, and can be positioned sufficiently close to each other such that adjacent fingers cooperately carry a first row of frankfurters 110. If desired, a second row of frankfurters 112 can be placed atop the first row in pyramid stacking fashion, for example. Fingers for automatically delivering the frankfurters can be constructed as generally indicated in dotted lines at 114; and can be made movable downwardly between fingers 42a to deposit product 102a thereon. Alternately, fingers 42a might be adapted to lift the product 102a from fingers 114 as they move upwardly to lift the product through guide ring 40 and into an appropriately designed container for receiving the same.

As yet another modification to the invention, the upper structure or surface of fingers 42 might desirably comprise freely rotatable bearings or rollers (not shown). Such can be employed, for example, to gain wider tolerances in placing product 102 onto fingers 42 in that the product could automatically "center itself" in guide ring 40 as it is being passed therethrough.

Although the invention has been particularly described in regard to loading tub-like parts such as container 82, it is readily apparent that the principles of the invention are readily applicable to loading a broad variety of other types of container parts including, for example, lids or base members.

Moreover, it is apparent that loading can take place at various positions on table means 12 as defined between fixed 9 o'clock and 3 o'clock positions thereon. It is only necessary that the product 102 be supported against the pull of gravity so that it may be moved generally upwardly into the container part. True vertical loading is not required. Thus, depending on various factors such as the degree of friction between product 102 and fingers 42, for example, loading can be accomplished at positions on the upper half of table means 12, as defined intermediate the indicated fixed 9 o'clock and 3 o'clock positions, without the product spilling off the fingers. In addition, where multiple modules 16 are included in combination with table means 16, the applicable number of modules would optimally comprise a factor of two, such as two, four, six, eight modules, and so on.

While certain representative embodiments and details have been shown for the purpose of illustrating the invention, it will be apparent to those skilled in the art that various changes and modifications can be made therein without departing from the spirit and scope of the invention.

What is claimed is:

1. Apparatus for loading compressible food-stuffs into a tight fitting package component, such component being of a general type including a hollow tub portion adapted to intimately receive the product, and a flange for joining said tub portion to a cover component, the flange being disposed generally adjacent the mouth of the tub portion and extending peripherally thereabout, said apparatus comprising a guide means having a first end portion and a second end portion, and defining a guide channel extending between said end portions, at least a portion of said guide channel being gradually tapered inwardly in the direction from said second end portion toward said first end portion, said guide channel adjacent said first end portion being substantially of like configuration and size to the mouth of the tub to be used in packaging said product, means for detachably retaining said component in inverted position against said first end portion and with the mouth of said tub portion being aligned and in communication with said guide channel, means for supporting said product adjacent said second end portion and in communication with said guide channel, means to cause relative movement to resiliently urge said product through said guide channel and into intimate contained relationship with said tub portion, means for rotating said tub portion from an inverted loading position to a release position where said tub portion is generally non-inverted.

2. The apparatus of claim 1 including, means for releasing said retaining means responsive to rotation of said tub portion to the non-inverted position, said urging means cooperatively with said retaining means being adapted to firmly retain said product and tub portion together for at least a substantial part of said rotation.

3. The apparatus of claim 2 including a plurality of loading modules constructed as set forth in claim 2, and fixed at angularly spaced distances about an axis, and means to intermittently rotate said modules about said axis.

4. The apparatus of claim 3 wherein said guide means is adapted to isolate a peripherally continuous portion of said flange from communication with said guide channel.

5. The apparatus of claim 4 wherein said guide channel comprises a hollow guide ring means having a rim adapted to peripherally support said tub portion immediately about the mouth thereof.

6. The apparatus of claim 3 wherein said urging means and retaining means are operated by remote activating means of fixed position.

7. The apparatus of claim 6 wherein said retaining means comprises movable clamping means spring loaded in a direction toward said first end portion.

8. The apparatus of claim 3 wherein said urging means comprises spring loaded means, said apparatus including means to activate said spring loaded means at a position that remains fixed.

9. The apparatus of claim 7 wherein said retaining means comprises spring loaded clamping means adapted to clamp said tub portion in fixed position with respect to said first end portion, and means to activate said clamping means at a position that remains fixed.

10. The apparatus of claim 3 wherein said urging means applies substantially constant force to urge the product through the guide channel and into said tub portion.

11. The apparatus of claim 10 wherein said urging means comprises spring loaded means.

12. The apparatus of claim 3 wherein said supporting means comprises spaced apart loading fingers.

13. A method for loading compressible products into a tight fitting package component, such component being of a general type including a hollow tub portion adapted to intimately receive the product, and a flange for joining the tub portion to a cover component, the flange being disposed generally adjacent the mouth of the tub portion and extending peripherally thereabout, said method comprising the steps of:

a. detachably retaining said tub portion in inverted position against an end portion of a guide means defining a hollow guide channel, the guide channel at its area adjacent said end portion being of substantially like configuration and size to the mouth of said tub portion and in aligned communication therewith, at least a portion of said guide channel being tapered outwardly in a direction away from said end portion, said end portion isolating a peripherally continuous extent of said flange portion from said guide channel, b. supporting the product adjacent the opposite end portion of said guide means and in generally aligned communication with said guide channel, the direction between said end portions being generally upwardly, c. resiliently urging said product through said guide channel and into intimate contained relationship within said tub portion by causing relative movement between said product and tub portion, and d. rotating said guide means and releasing said tub.

14. The method of claim 13 wherein said urging force is continued for at least a substantial part of said rotating step.

15. The method of claim 13 wherein step (c) comprises dropping the loaded tub portion onto a conveyor.

* * * * *